No. 697,723. Patented Apr. 15, 1902.
T. H. IRWIN & H. J. MILLER.
CARBONATING MACHINE.
(Application filed Mar. 16, 1901. Renewed Feb. 14, 1902.)
(No Model.)
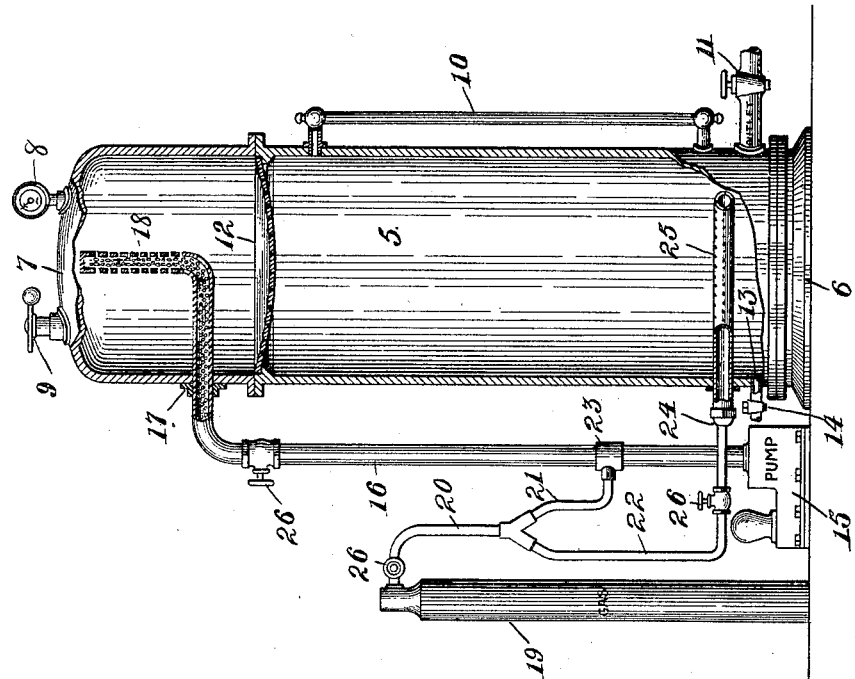
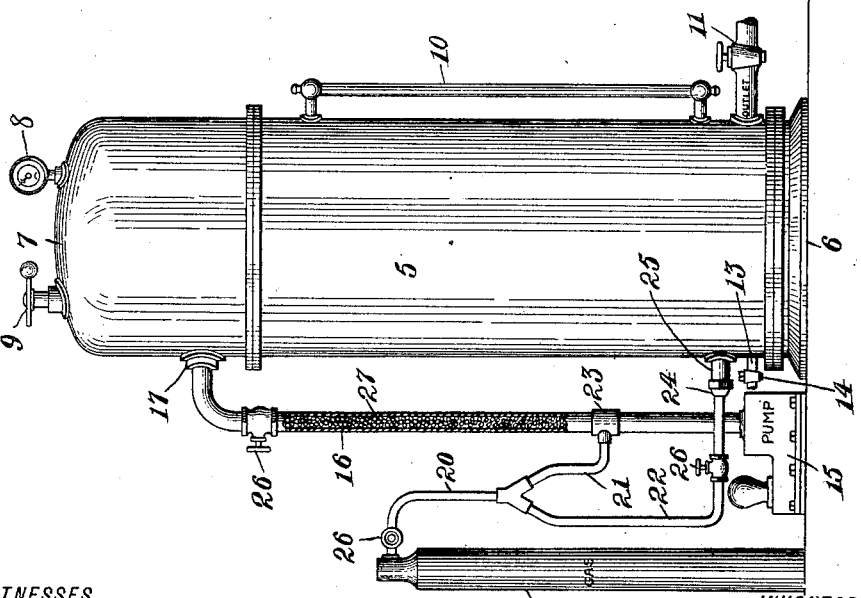
WITNESSES
C. W. Smith
F. A. Stewart
INVENTORS
Thomas H. Irwin
and Henry J. Miller
BY
Edgar Tate
ATTORNEYS
THE NORRIS PETERS CO., PHOTO-LITHO., WASHINGTON, D. C.

UNITED STATES PATENT OFFICE.

THOMAS H. IRWIN, OF JERSEY CITY, NEW JERSEY, AND HENRY J. MILLER, OF BROOKLYN, NEW YORK.

CARBONATING-MACHINE.

SPECIFICATION forming part of Letters Patent No. 697,723, dated April 15, 1902.

Application filed March 16, 1901. Renewed February 14, 1902. Serial No. 94,133. (No model.)

*To all whom it may concern:*

Be it known that we, THOMAS H. IRWIN, residing at Jersey City, in the county of Hudson and State of New Jersey, and HENRY J. MILLER, residing at Brooklyn, in the county of Kings and State of New York, citizens of the United States, have invented certain new and useful Improvements in Carbonating-Machines, of which the following is a full and complete specification, such as will enable those skilled in the art to which it appertains to make and use the same.

This invention relates to carbonators such as are employed in carbonating liquids, and particularly for carbonating water; and the object thereof is to provide an improved device of this class particularly designed for use in drug-stores and other places as a soda-water fountain; and with this and other objects in view the invention consists in an apparatus of the class specified constructed as hereinafter described and claimed.

The invention is fully disclosed in the following specification, of which the accompanying drawings form a part, in which the separate parts of our improvement are designated by the same reference characters in each of the views, and in which—

Figure 1 is a side elevation of a carbonator made according to our invention, partly in section; and Fig. 2, a sectional view thereof.

In the practice of our invention we provide a casing 5, which is preferably cylindrical in form and provided with a bottom 6 and top 7, said top being provided with an ordinary pressure-gage 8 and safety-valve 9, and said casing is also provided at one side with a water-gage 10 and near the bottom thereof with the usual faucet 11, and within the casing 5, at a predetermined distance from the top thereof, is placed a perforated partition or diaphragm 12, and said casing is also provided at the bottom with a discharge-pipe 13, having a valve 14. At one side of the casing 5 is placed a water-pump 15, provided with a pipe 16, which communicates with the casing 5 above the diaphragm 12, as shown at 17, and which extends into said casing and is provided with an upwardly-directed member 18, which is perforated throughout, and adjacent to the pump 15 is placed in practice a gas-tank 19, which is provided at the top thereof with a pipe 20, which is provided with two branches 21 and 22. The branch pipe 21 communicates with the pipe 16 at 23, while the pipe 22 connects at 24 with a larger pipe 25, which extends into the bottom portion of the casing 5 and is perforated, as shown in Fig. 2. The pipes 16, 20, and 22 are provided with valves, as shown at 26, and the pipe 16 is preferably filled with small spherical balls or bodies 27, as shown in Fig. 1, the object of said balls or bodies being to break up the water into small globules as it passes through said pipe.

The operation will be readily understood when taken in connection with the accompanying drawings and the following statement thereof. The connections between the gas-tank 19, the pipe 16, and the casing 5 being made as described, the pump 15 is put in operation and water or other liquid is forced through the pipe 16 into the top portion of the casing 5, and at the same time the gas passes through the pipes 20, 21, and 22 into the bottom of said casing, and said gas mingles with the water as it passes through the pipe 16 and is discharged therewith through the perforated portion 18 of said pipe into the top portion of the casing 5, and the water passing into the top portion of the casing 5 passes downwardly through the perforated partition or diaphragm 12 into the bottom of said casing. At the same time the gas passes into the bottom of the casing and into the water or other liquid therein and mingled thoroughly therewith, and in this manner the water or other liquid is carbonated.

The top portion 7 of the casing 5 is removable, and the top portion of the pipe 16 may be removable therewith, and the object of the pipe 13 in the bottom portion of the casing 5 is to provide means for thoroughly cleaning said casing whenever desired, and it will be understood that the perforated diaphragm or partition 12 may also be removed in the operation of cleaning the apparatus.

The object of placing the small balls or bodies 27 in the pipe 16 is to break up the water and permit the gas to mingle freely therewith, and such balls or bodies may also be placed in the inner end 18 of the tube 16, if desired, as shown in Fig. 2.

It will be apparent that this apparatus may be used for carbonating any kind or class of liquids, and the said apparatus may also be used wherever a carbonating apparatus is desired, and said apparatus is particularly designed for use in drug-stores and similar places as a soda-water fountain.

Having fully described our invention, what we claim as new, and desire to secure by Letters Patent, is—

1. In a carbonating apparatus, the combination with a tank or casing consisting of a lower and an upper portion secured together, of a perforated partition or diaphragm secured between the two portions thereof, a water-pipe provided with an upwardly-extending end having side perforations in communication with the upper portion of the tank or casing above the diaphragm and extending downward on the outside parallel with the lower portion of the casing, a water-pressure supply in communication with the water-pipe at the lower end, a gas-pipe in communication with the water-pipe above the communication with the water-supply, a gas-pipe having side perforations extending into the lower portion of the casing adjacent to the bottom, and a gas-pressure supply in communication with the gas and with the water-pipes, substantially as shown and described.

2. In a carbonating apparatus, the combination with a tank or casing consisting of a lower and an upper portion secured together, of a perforated partition or diaphragm secured between the two portions thereof, a water-pipe provided with an upwardly-extending end having side perforations in communication with the upper portion of the tank or casing above the diaphragm and extending downward on the outside parallel with the lower portion of the casing, a water-pressure supply in communication with the water-pipe at the lower end, a gas-pipe in communication with the water-pipe above the communication with the water-supply, a gas-pipe having side perforations extending into the lower portion of the casing adjacent to the bottom, a gas-pressure supply in communication with the two gas-pipes, and a filling of solid matter in the form of pebbles, &c. in the water-pipe above the communication with the gas-supply pipe therewith, substantially as shown and described.

In testimony that we claim the foregoing as our invention we have signed our names, in presence of the subscribing witnesses, this 12th day of March, 1901.

THOMAS H. IRWIN.
HENRY J. MILLER.

Witnesses:
T. A. STEWART,
F. TELLER.